Jan. 19, 1971   J. W. KAUFMAN   3,556,667
SCRUBBING IMPLEMENTS
Filed Sept. 5, 1967   4 Sheets-Sheet 1
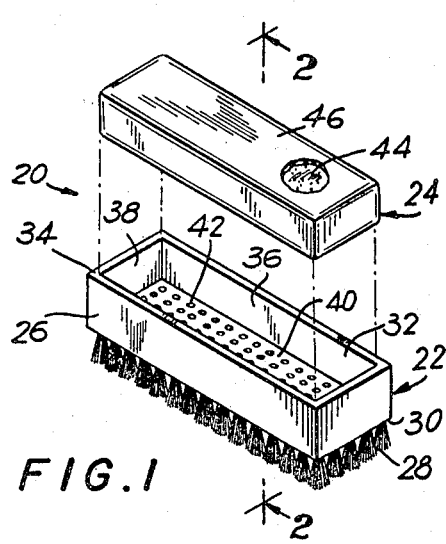
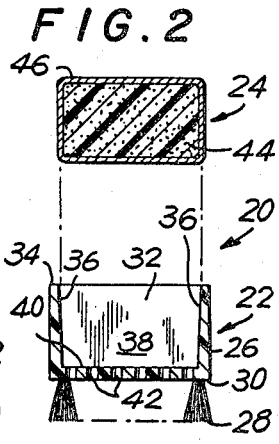
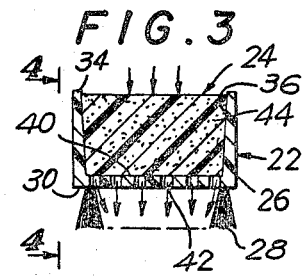
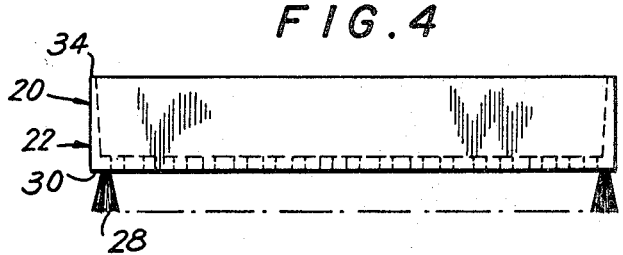
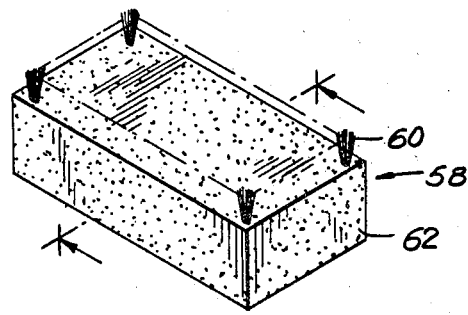
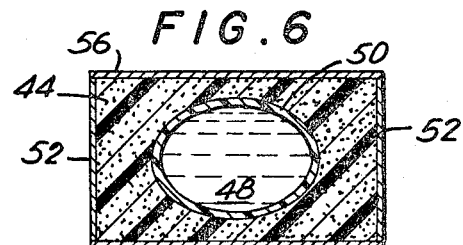
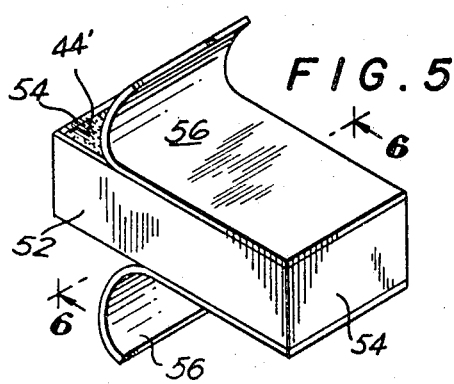
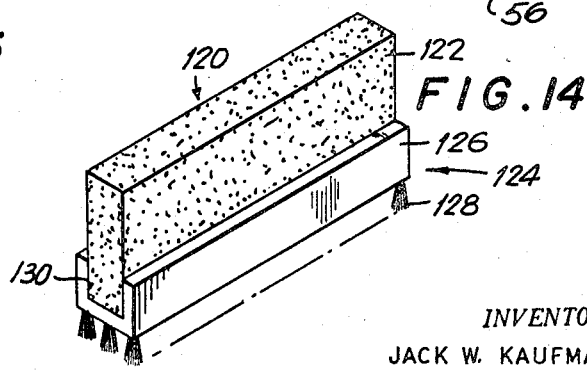
INVENTOR.
JACK W. KAUFMAN
BY
Lackenbach & Siegel
ATTORNEYS

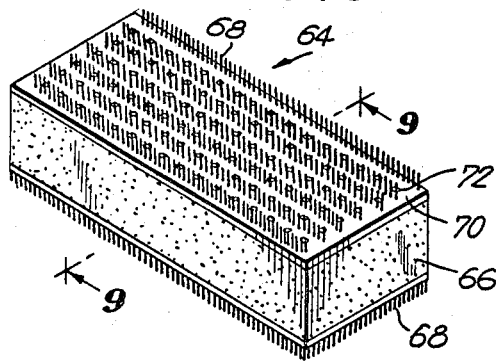
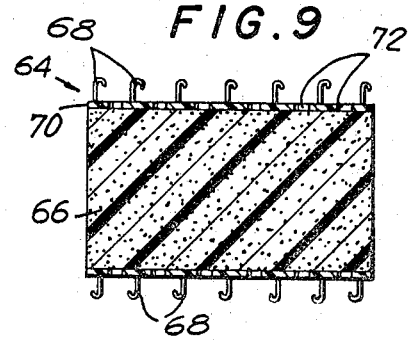
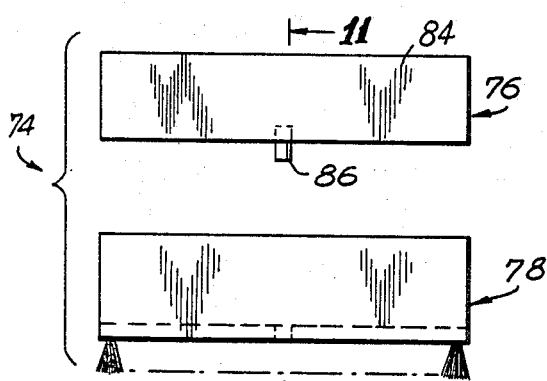
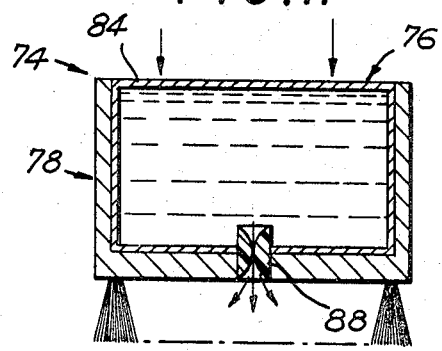
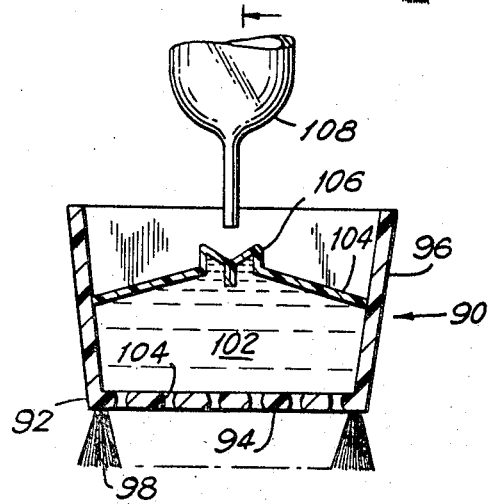
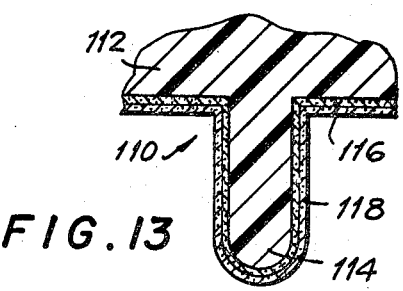

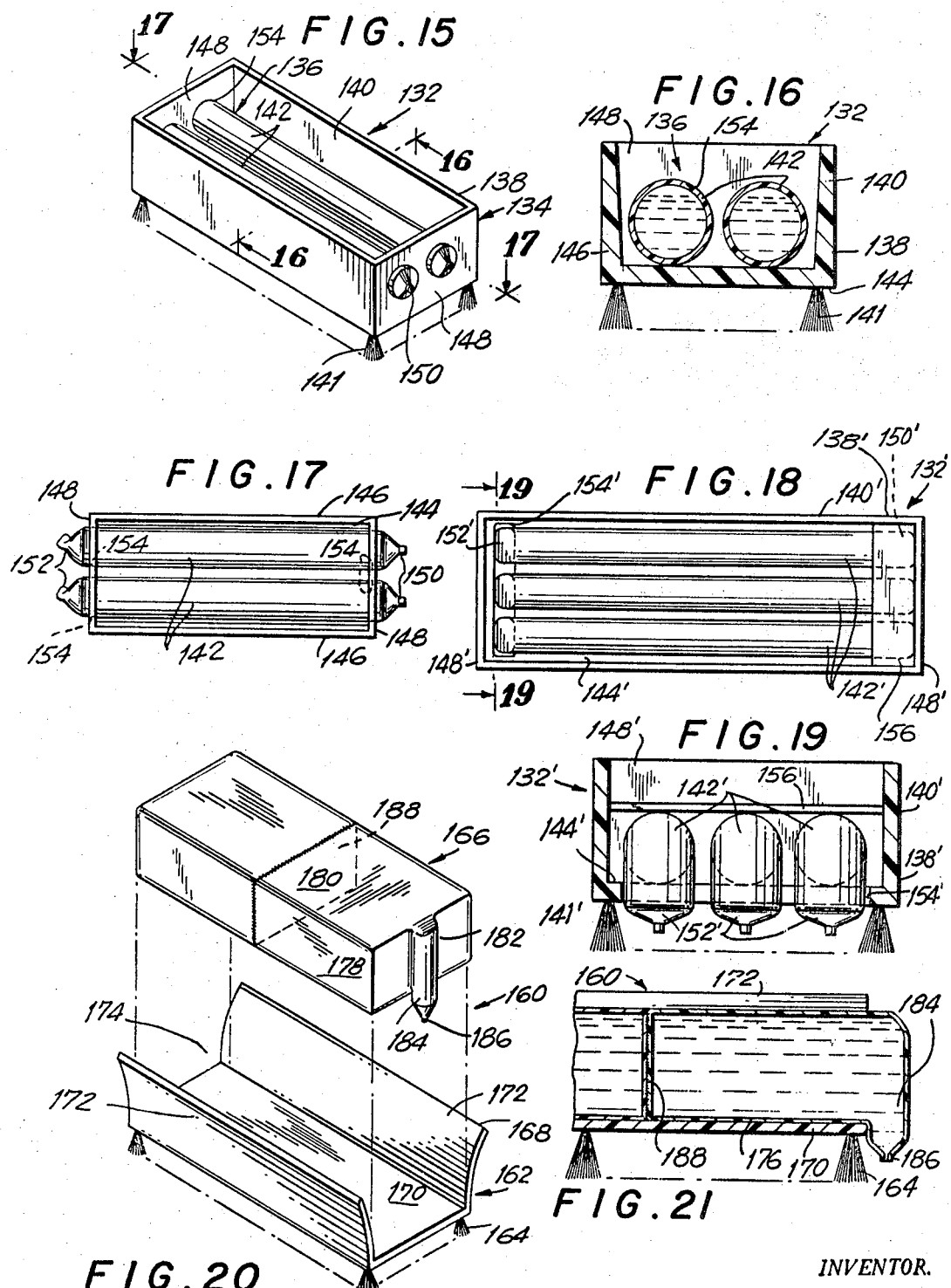

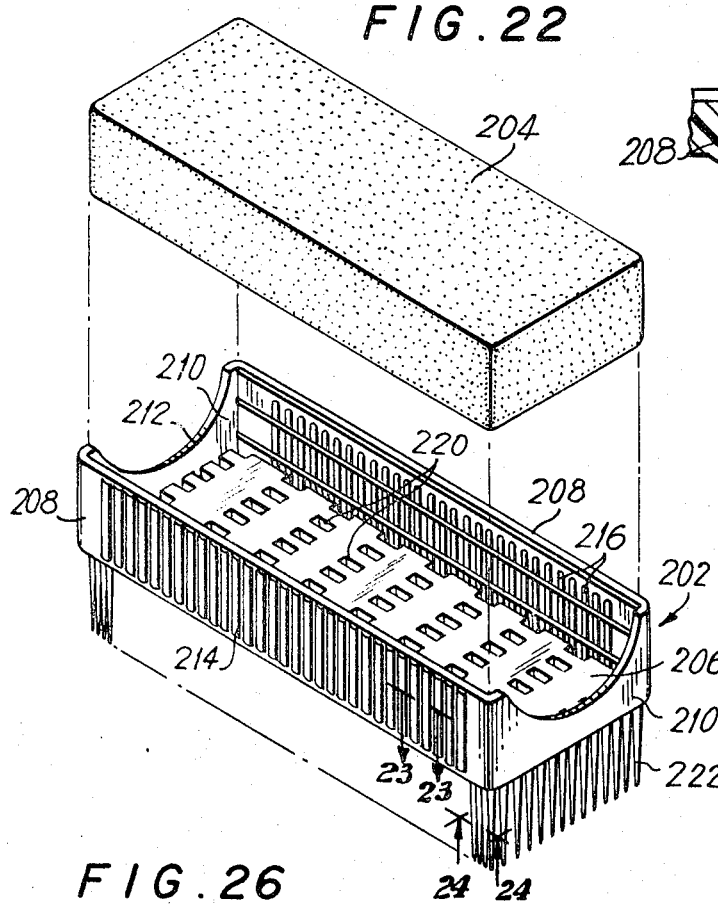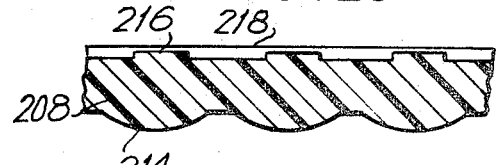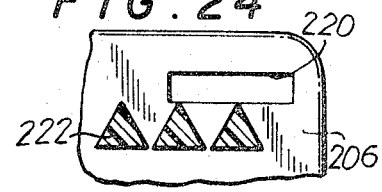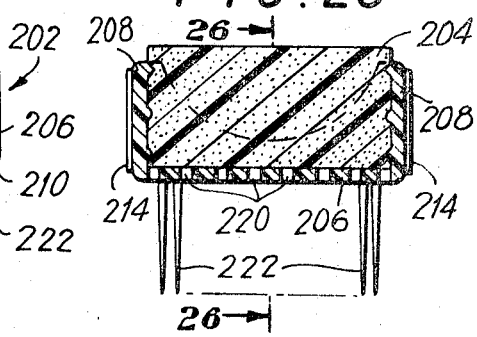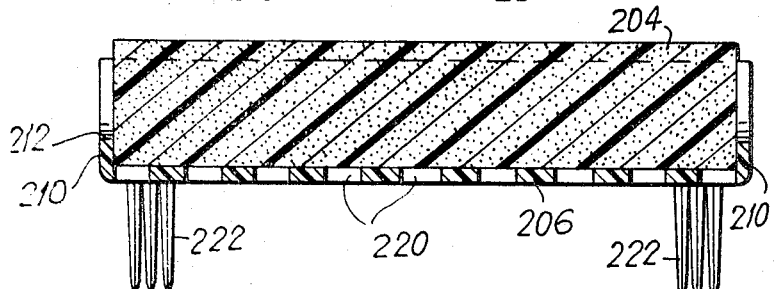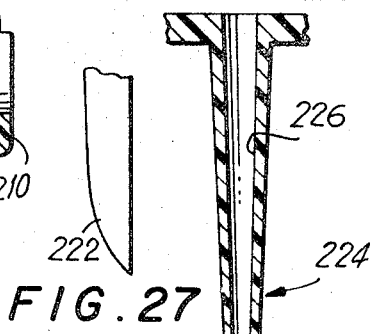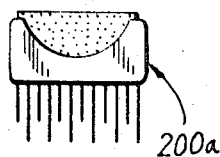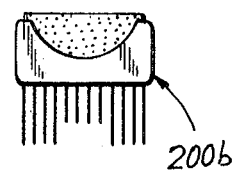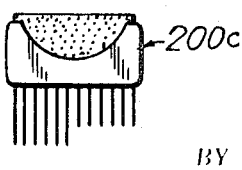

United States Patent Office 3,556,667
Patented Jan. 19, 1971

3,556,667
SCRUBBING IMPLEMENTS
Jack W. Kaufman, Corona, N.Y.
(37—71 Junction Blvd., Jackson Heights, N.Y. 11372)
Continuation-in-part of application Ser. No. 660,477,
Aug. 14, 1967. This application Sept. 5, 1967, Ser.
No. 665,593
Int. Cl. A46b *11/04*
U.S. Cl. 401—28
19 Claims

ABSTRACT OF THE DISCLOSURE

Implements, as for cleansing by scrubbing with the use of a cleansing compound, such as for surgical post or pre-operative scrubbing with a germicidal soap comprising, means for providing rubbing type scrubbing action, for example, a pored surface or a plurality of bristle-like elements, such as Velcro or brush bristles and a quantity of compound, for example, a cleansing compound such as a germicidal soap compound associated therewith, for example, by direct coating on the scrubbing means or by being contained within a dispensing type reservoir for application to the scrubbing, means, such as being contained within a block of resilient foam-like material or within a flexible walled container whereby pressure on the container or foam block will cause dispensing of the cleansing compound outwardly thereof and onto the scrubbing means, the foam block or container being either permanently associated with the scrubbing means to define a throw-away type implement or the block or container being replaceably associated therewith to enable retention of the scrubbing means with replacement of the container or block, such block or throw-away implement being preferably furnished with protective covering means during transport, storage and prior to usage thereof, such as a peelable or strippable layer of water-proof adhesively secured material or a layer of water-soluble material; the implement further preferably comprising means for dispensing the cleansing compound to the bristles, as by a plurality of apertures extending between the reservoir and the bristles, the bristles being formed for providing effective and comfortable scrubbing action, and the implement being flexible and of a size and configuration enabling easy manipulation thereof.

---

This application is a continuation-in-part of Ser. No. 660,477, filed Aug. 14, 1967.

This invention pertains generally to cleansing implements and, more particularly, to cleansing implements for scrubbing with the use of a cleansing compound.

It is a primary object of the present invention to provide cleansing implements having a reservoir adapted to contain a quantity of a cleansing compound and to dispense such cleansing compound as needed.

Another primary object of the present invention, in addition to the foregoing object, is to provide such cleansing implements adapted to present a scrubbing type action.

Still another primary object of the present invention, in addition to each of the foregoing objects, is to provide such cleansing implements with removable and replaceable reservoir means.

The further primary object of the present invention, in addition to each of the foregoing objects, is to provide such cleansing implements which are inexpensive, and, accordingly, disposable after use.

A still further primary object of the present invention, in addition to each of the foregoing objects, is to provide such cleansing implements wherein the reservoir means is adapted to be protected from environmental conditions during transit, storage, and prior to use.

A still further primary object of the present invention, in addition to each of the foregoing objects, is to provide such cleansing implements having scrubbing type means which are adapted to be protected from environmental conditions during transit, storage, and prior to use.

In addition to each of the foregoing objects, it is another primary object of the present invention, to provide such cleasing implements which are compact, and easy to use.

It is also a primary object of the present invention, in addition to each of the foregoing objects, to provide such cleansing implements with a quantity of a germicidal surgical scrub compound, enabling the cleansing implements to be utilized for pre- or post-operative surgical scrub procedures.

It is a yet still further primary object of the present invention, in addition to each of the foregoing objects, to provide such cleansing implements wherein the reservoir means comprises a foam-like block of material.

A yet still further primary object of the present invention, in addition to each of the foregoing objects, is to provide such cleansing implements wherein the reservoir means is compacted or compressed for transport, storage, or the like, and swells or expands to a larger size upon being made ready for use.

Another and yet still further primary object of the present invention, in addition to each of the foregoing objects, is to provide such cleansing implements having sterilizable scrubbing means adapted to be associated with a replaceable supply of cleansing compound.

A yet still further primary object of the present invention, in addition to each of the foregoing objects, is to provide such cleansing implements which are adapted to be maintained in a sterile and clean condition during transport, storage, or the like, and which may be made ready for use simply and easily, as by being rinsed or immersed in hot water.

It is still another primary object of the present invention, in addition to each of the foregoing objects, to provide such cleansing implements utilizing a "Velcro" type material as the scrubbing means.

It is another and yet still further primary object of the present invention, in addition to each of the foregoing objects, to provide such cleansing implements having compartmented or plural reservoir means to enable multiple use thereof of fresh supplies of cleansing compound without replacement or replenishment of the reservoir means.

The invention resides in the combination, construction, arrangement and disposition of the various component parts and elements incorporated in improved cleansing implements constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIG. 1 is an exploded isometric illustration of a cleansing implement comprising scrubbing means and reservoir means constructed in accordance with the principles of the present invention;

FIG. 2 is an elevational cross-sectional view taken along line 2—2 of FIG 1;

FIG. 3 is an end elevational cross-sectional view of the cleansing equipment of the preceding figures illustrating the implement in the assembled configuration thereof ready for use;

FIG. 4 is a side elevational view of the cleansing implement of the preceding figures;

FIG. 5 is an isometric view of another reservoir suitable for use in the cleansing implement of the preceding figures;

FIG. 6 is an elevational cross-sectional view taken along line 6—6 of FIG. 5;

FIG. 7 is an isometric view of another cleansing implement constructed in accordance with the principles of the present invention;

FIG. 8 is an isometric view of still another cleansing implement constructed in accordance with the principles of the present invention;

FIG. 9 is an elevational cross-sectional view taken along line 9—9 of FIG. 8;

FIG. 10 is an exploded elevational view of still another cleansing implement constructed in accordance with the principles of the present invention;

FIG. 11 is an end elevational cross-sectional view taken substantially along line 11—11 of FIG. 10 but illustrating the cleansing implements thereof in the assembled configuration ready for use;

FIG. 12 is a cross-sectional elevational view of still another cleansing implement constructed in accordance with the principles of the present invention;

FIG. 13 is a partial elevational cross-sectional illustration of yet another cleansing implement constructed in accordance with the principles of the present invention;

FIG. 14 is an isometric illustration of yet still another cleansing implement constructed in accordance with the principles of the present invention;

FIG. 15 is an isometric illustration of a still further cleansing implement construction in accordance with the principles of the present invention;

FIG. 16 is a cross-sectional view taken along line 16—16 of FIG. 5;

FIG. 17 is a top plan view of the cleansing implement of the preceding figures;

FIG. 18 is a top plan view of a yet still further cleansing implement constructed in accordance with the principles of this invention;

FIG. 19 is a cross-sectional view taken along line 19—19 of FIG. 18;

FIG. 20 is an exploded isometric view of another and yet still further cleansing implement constructed in accordance with the principles of this invention;

FIG. 21 is a partial side elevational cross-sectional medial view of the cleansing implement of the preceding figure illustrating the implement in the assembled configuration thereof;

FIG. 22 is an exploded isometric view of yet another implement constructed in accordance with the principles of the present invention;

FIG. 23 is an enlarged cross-sectional partial view taken along line 23—23 of FIG. 22;

FIG. 24 is an enlarged cross-sectional partial view taken along line 24—24 of FIG. 22;

FIG. 25 is an end elevational cross-sectional view of the implement of the preceding figures;

FIG. 26 is a side elevational cross-sectional view taken along line 26—26 of FIG. 25;

FIG. 27 is an enlarged elevational partial view of the end portion of a single bristle element of the preceding figures;

FIG. 28 is an enlarged cross-sectional partial view of another bristle element suitable for use with the present invention;

FIG. 29 is an end elevational schematic illustration of a yet further implement, similar to the implement of the preceding figures, constructed in accordance with the principles of this invention;

FIG. 30 is an end elevational schematic illustraton of still another implement, similar to the implements of the preceding figures, constructed in accordance with the principles of this invention; and FIG. 31 is an end elevational schematic illustration of yet another cleansing implement, similar to the implements of thep receding figures, constructed in accordance with the principles of the present invention.

Generally, the present invention comprises improved cleansing implements for scrubbing with the use of a cleansing compound, such as for surgical pre or post-operative scrubbing with a germicidal soap comprising, means for providing abrasive type scrubbing action, for example, a plurality of bristle-like elements, such as "Velcro" or brush type bristles and a quantity of cleansing compound, for example, a germicidal soap compound such as Phisohex associated therewith, for example, by direct coating on the scrubbing means or by being contained within a dispensing type reservoir for application to the scrubbing means, such as being contained within a block of resilient foam-like material or within a flexible walled container whereby pressure on the container or foam block will cause dispensing of the cleansing compound outwardly thereof, the block or container being either permanently associated with the scrubbing means to define a throw-away type implement or the block or container being replaceably associated therewith to enable retention of the scrubbing means with replacement of the container or block, such block or throw-away implement being furnished, preferably, with protective covering means during transport, storage, and prior to usage thereof, such as a peelable or strippable layer of waterproof adhesively secured material or a layer of water-soluble material. Furthermore, the bristle-like elements may be associated with the reservoir means by means of a perforate backing, enabling the cleansing compound to be dispensed from the reservoir means through the perforate backing and on to the bristle-type elements, the bristle-type elements being either integrally formed with the backing member, as in a single molding operation, or being separately formed and secured therewith in a conventional brush forming manner. The bristles may comprise substantially any desired material, preferably a material which is readily sterilizable, the bristles being formed, for example, of styrene, polypropylene, natural bristles, nylon, or the like, or, the bristles may be of a "Velcro" type material made in any desired grade of coarseness and/or thickness as well as in any desired length of the filaments. The reservoir means may comprise, for example, a block of urethane foam, polyurethane foam, natural sponge, sponge latex, sponge porelon, or the like, and the block of foam-like material may be provided with a chamber therewith for containing the cleansing compound or may be impregnated with the cleansing compound and then may be compressed and/or freeze dried to provide a compact and light-weight package which will swell upon wetting with water, or the reservoir means may comprise one or more containers having at least one flexible wall portion.

With reference now to the drawing, and particularly to FIGS. 1–4 thereof, there is shown and illustrated a cleansing implement constructed in accordance with the principles of the present invention and designated generally by the reference character 20.

The cleansing implement 20 comprise scrubbing means 22 and reservoir means 24 adapted to be structurally associated therewith.

The scrubbing means 22 comprises a backing or handle member 26 fabricated of any desired conventional material, such as metal, plastic, ceramic, or the like, and a plurality of elongate bristle-like abrasing or scrubbing elements 28 structurally associated therewith and likewise fabricated of any desired conventional material, such as, for example, styrene, polypropylene, nylon, substantially any other plastic, natural bristles, or the like. The bristle-like elements 28 may be formed independently of the backing or handle member 26, and structurally associated therewith in a conventional brush-forming manner, as by being cemented or adhesively cohesively or mechanically secured therewith, or may be integrally formed with the backing or handle member 26, as by molding techniques. Regardless of the materials of which the backing or handle member 26 and the bristle-like elements 28 are formed, and the manner of fabrication thereof, the bristle-like elements 28 preferably extend generally outwardly of a lower surface 30 of the backing or handle member 26. The backing or handle member 26 may be of any desired size and configuration, and may be provided with extensions, ears, depressions, grooves, or the like, to assist in grasping and manipulating the implement, if desired. The backing or handle member 26 may be provided with a recess, groove or opening 32 extending generally inwardly from the surface opposite the lower surface 30, or the upper surface 34 thereof, within which the reservoir means 24 is particularly adapted to be disposed. The recess, groove or opening 32 may, for example, be defined by side walls 36, end walls 38, and a bottom wall 40. The backing or handle member 26 may be further provided with one or a plurality of apertures 42 extending relative to the bottom wall 40 for enabling passage of cleansing compound from the reservoir means 24 to the bristle elements 28 during use.

The reservoir means 24 may comprise a block of material 44 fabricated of a material which is of a resilient nature, or of a material which when wetted, as with water, or the like, is of a resilient nature. For example, the block of material 44 may comprise a block foam-like material such as sponge rubber, natural sponge, or a sponge plastic, such as urethane, polyurethane, propylene, polypropylene, porelon, or the like, or any material, such as paper, felted textile fibers, or the like, which can absorb, adsorb, or contain within or on it an appropriate cleansing compound, and which, at least when wetted, is capable of exuding or dispensing the cleansing compound outwardly thereof. For example, the block of material 44 may comprise a block of foam-like material impregnated with the cleansing compound.

The reservoir means 24 may be either pre-assembled with the scrubbing means 22 so that the cleansing implement 20 may be furnished in a ready-to-use condition or configuration, or the reservoir means 24 may be furnished as a separate unit, capable of assembly with the scrubbing means 22 enabling ready replacement of the reservoir means 24 as the supply of cleansing compound contained therein is used up, or for each per- or post-operative scrub, or the like. The reservoir means 24 may be refillable or may comprise an inexpensive throw-away unit complete with a supply of cleansing compound.

The reservoir means 24 may further comprise protective covering layer means, such as a layer of water soluble material 46, comprising, for example, gelatin or cellulose, enabling the reservoir unit 44 to remain clean and sterile and preventing loss of cleansing compound therefrom during transport, storage, and prior to use, it being merely necessary to run hot water, or the like, over the reservoir means 24 either prior to or following insertion of the reservoir means 24 in the backing member 26 immediately prior to use.

Additionally, the reservoir means 24 may be furnished in a compressed condition enabling more compact storage thereof. For example, the block of material 44 may comprise a polyurethane foam impregnated with the cleansing compound, which following impregnation may be compressed and then freeze dried to form a lightweight, dry and relatively compact block of material which, upon wetting with water, or the like, may swell to its initial size and configuration. Following the compression and freeze drying, the block of material 44 may be covered with the protective covering layer 46. Similarly, the block of material may be freeze dried without compression or compressed without freeze-drying.

With reference now to FIGS. 5 and 6, there is shown and illustrated another reservoir means 24' constructed in accordance with the principles of the present invention and usable with the backing or handle member 26. The reservoir means 24' similarly comprises a block of resilient or foam-like material 44', but, rather than being entirely impregnated with the cleaning compound, the block of material 44' is provided with a generally central opening or chamber 48, the cleansing compound being contained within the chamber 48. If the cleansing compound comprises a solid, a viscous material, or a communited material, then the cleansing compound may be contained within the chamber 48, without any additional means to retain it therein, and the block of material 44 may be compressed and/or dried as heretofore set forth. However, if the cleansing compound comprises a liquid or a hygroscopic material, for example, or any other material which requires or supports the use of additional means to retain it within the chamber 48 or to protect the cleansing compound from atmospheric contact, or the like, then the chamber 48 may be provided with a membrane or wall 40 fabricated of a material which would be readily rupturable upon compression of the block of material 44' to release the cleansing compound from the chamber 48.

The reservoir means 24' may be further provided with protecting covering layer means, such as the hereinbefore described water soluble layer or adhesively secured side layers 52, end layer 54 and top and bottom layer 56. The top and bottom layers 56, for example, may be peelable or strippable away from the block of material 44', as shown in FIG. 5 to expose the block of material 44 for use. The layers 52, 54 and 56 may, for example, comprise waterproof adhesive tape, or may comprise a gelatin, cellulose, plastic, or the like, coating applied to the block of material 44' and adapted to be at least partially readily removable, as by a stripping or peeling action, and may be provided with preliminary weakening means, such as score lines, or the like, or with tear threads to enable the appropriate portions thereof to be readily removed immediately prior to use.

Of course, the protective covering layer means shown in FIG. 5 is equally adaptable for use with any of the other embodiments or modifications of the present invention, as is the protective layer means of FIG. 2.

In addition to the reservoir means being adapted for structural association with the backing means, as hereinabove described and disclosed, the bristle-like structures may also be directly associated with the reservoir means. For example, with reference now to FIG 7, there is shown and illustrated another cleansing implement constructed in accordance with the principles of the present invention and designated generally by the reference character 58 wherein the scrubbing means comprises a plurality of bristle-like elements 60 directly structurally associated with a block of absorbent or resilient material 62, the block of material 62 being fabricated, for example, similarly to the block 44 or 44'. The bristle-like elements 60 may be either integrally molded with the block of material 62, or may be separately formed and associated therewith in any desired manner, such as mechanically, as by being forced thereinto or by being inserted within apertures provided therein, or may be associated with the surface thereof, as by means of an adhesive, or the like. The cleansing implement 58 may, if desired, be provided with adequate protective layer means, as herein elsewhere described and disclosed.

With reference now to FIGS. 8 and 9, there is shown and illustrated yet another cleansing implement constructed in acocrdance with the principles of the present invention and designated generally by the reference character 64. The cleansing implement 64 comprises a block of resilient or absorbent material, such as a block of foam or porelon 66 provided on one or more surfaces thereof with a plurality of bristle-like elements 68 extending outwardly therefrom. The bristle-like elements 68 may comprise, for example, a plurality of filaments structurally associated with a backing layer 70, which in turn is secured with the block of material 66, as by means of an adhesive. The filaments 68 and backing layer 70 may be of the type of material generally referred to as Velcro. The filaments 68 may be of any desired grade of coarseness, thickness, length, and spacing. The backing layer 70 is preferably perforate as by being provided with one or a plurality of holes or apertures 72 extending therethrough to enable the passage of cleansing compound from the block of material 66 to the filaments 68. As shown, the cleansing implement 64 may be provided with the Velcro-like material on two sides thereof, and it is to be understood that the two pieces of Velcro-like material may be either similar or may be of differing coarseness, enabling one side to be used for scrubbing the skin, and the other side, having, for example, longer filaments to be utilized for scrubbing under the nails. The other edges of the block of material 66 may be covered or may be exposed and, if exposed, may also be utilized as cleansing or scrubbing surfaces. The block of material 66 may be either impregnated with the cleansing compound or the cleansing compound may be contained within chamber means formed within the block of material 66, as described and disclosed hereinbefore. The cleansing implement 64 may be further provided with protective layer means, as hereinabove described and disclosed, either fixed or removable. It is also within the scope or ambit of the present invention to utilize a Velcro-like material as a scrubbing element either alone or in combination with any other reservoir means.

Each of the cleansing implements hereinabove described and disclosed are readily suitable for many cleansing operations, and particularly, for surgical pre- or post-operative scrub purposes, especially when the cleansing compound comprises a germicidal soap compound, such as Phisohex. In use, the block of material 66 may extend outwardly of the backing means or the scrubbing means, enabling the protective layer means to be readily removed, if provided, and the surface of the block of material utilized for initial scrub purposes, over large areas of skin, or the like. The cleansing compound may be dispensed outwardly to the surfaces thereof by merely squeezing the block of material. For purposes of scrubbing around and under the nails, for example, the bristle-like elements, which are likewise supplied with the cleansing compound upon squeezing or kneading of the block of material are eminently suitable. The cleansing compound may also be dispensed directly onto the surface to be cleaned, rather than through the scrubbing means, if desired, and the scrubbing means utilized in a conventional manner.

With reference now to FIGS. 10 and 11, there is shown and illustrated yet still another cleansing implement constructed in accordance with the principles of the present invention and designated generally by the reference character 74. The scrubbing implement 74 comprises reservoir means 76 and scrubing means 78 adapted to be structurally inter-associated.

The scrubbing means 78 may, for example, comprise a backing or handle member 80 and a plurality of bristle-like members 82, similar to the scraubbing means 22. The reservoir means 76 is adapted to be structurally associated with the scrubbing means 78 and it may comprise a generally tank-like container 84 particularly adapted to contain therewithin a quantity of cleansing compound. The reservoir means 76 may further comprise outlet valve means 86 which may, for example, be of a pressure operated or operable type so that when the cleansing compound within the tank or container 84 is pressurized, the cleansing compound contained therewithin may be dispensed outwardly through the valve means 86.

The backing or handle member 80 may be provided with aperture means 88, valve means 86 being particularly adapted to be disposed therewithin. At least the top wall of the tank or container 84 may be fabricated of a generally resilient material, enabling simple finger or hand pressure thereon to pressurize the interior of the tank or container 84, and particularly, the cleansing compound contained therewithin to dispense the cleansing compound outwardly through the valve means 86. The entire tank or container 84 may, if desired, be fabricated of a flexible material, such as plastic film, metal foil, or the like.

The reservoir means 76 may be fabricated, for example, of inexpensive material, such as metal, plastic, coated paper, or cardboard, or the like, and may be furnished as either a throw-away refill unit or, may be refillable, either through the valve means 86 or through another opening provided for that purpose.

Moreover, the scrubbing means may be adapted for use with any or all of the reservoirs by the appropriate provision of aperture.

With reference now to FIG. 12, there is shown and illustrated another and yet still further cleansing implement constructed in accordance with the principles of the present invention and designated generally by the reference character 90 within the reservoir is integral with the scrubbing means and is refillable.

The cleansing implement 90 comprises a member 92 having a base wall 94 and a plurality of side walls 96 extending upwardly therefrom. Scrubbing means, such as a plurality of bristle-like elements 98 may be structurally associated with the base wall 94 depending generally downwardly therefrom. The base wall 94 may be further provided with a plurality of apertures or feeder channels 100 to provide fluid communication between the reservoir which is defined by the upstanding walls 96 and the base wall 94 to permit the egress of a cleansing compound contained therewithin outwardly thereof and onto the bristle-like elements 98. The reservoir or chamber 102 is further defined by a top plate comprising, for example, a diaphragm 104 fabricated, for example, of thin plastic or thin metal which is sufficiently resilient and flexible that finger pressure downwardly thereon will force the cleansing compound contained within the reservoir 102 outwardly through the feeder channels or apertures 100. The top wall or diaphragm 104 may be further provided with inlet valve means 106 to enable the reservoir chamber 102 to be filled or refilled, as by means of a tube 108.

The bottom wall 94 may be fabricated of a resilient material constructed and arranged to automatically close the apertures 104 in the absence of pressure being applied to the top wall 104 and thereby retain the cleansing compound within the chamber during storage.

In each of the embodiments or modifications hereinabove described and disclosed, the cleansing compound is dispensed onto the bristle-like elements by means of pressure applied to reservoir means. It is also within the scope of the present invention to provide the reservoir means in the form of a coating of cleansing compound over the surface of the bristle-like elements to automatically apply the cleansing compound to the surface being cleaned during scrubbing thereof. Accordingly, with reference now to FIG. 13, there is shown and illustrated a portion of yet another cleansing implement constructed in accordance with the priciples of the present invention and designated generally by the reference character 110. The cleansing implement 110 comprises a backing member 112 having structurally associated therewith a plurality of bristle-like elements 114. The bristle-like elements 114 may be either integrally formed with the backing member 112, as by being molded therewith, or may be separately formed and secured therewith, either mechanically or adhesively, as in aperatures, in a conventional manner. A layer of cleansing compound 116 may be structurally associated or coated onto the bristles, and/or onto the lower surface of the backing member 112, so that upon contact with water, or the like, the cleansing compound will be dissolved, rubbed off, or placed into solution and into a form for providing cleansing of a surface being scrubbed with the bristle-like elements 114. As in the previous embodiments, a protective covering layer, such as a layer of gelatin or cellulose 118 may then be coated over the surface of the layer of cleansing compound 116.

As heretofore pointed out, the reservoir means may extend substantially outwardly of the scrubbing means to act as a dispenser for directly applying the cleansing compound to be scrubbed.

Accordingly, and with reference now to FIG. 14, there is shown and illustrated a cleansing implement constructed in accordance with the principles of the present invention and designated generally by the reference character 120.

The cleansing implement 120 comprises a block of absorbent material 122 and scrubbing means 124. The block of material 122 may, for example, be a relatively thin and wide block of material impregnated with a cleansing compound, the scrubbing means 124 comprising a backing member 126 having a plurality of bristle-like members 128 extending generally outwardly therefrom in one direction, and a channel 130 formed in the backing member 126 generally opposite the bristles 128, with the edge portion of the block of material 122 being adapted to be disposed within the channel 130. In this embodiment, there is no necessity for the provision of any apertures or channels extending between the channel 130 and the bristles 128, although such may be provided, if desired. In use, the cleansing block of material 122 may be utilized to initially scrub the skin, and to apply the cleansing compound thereto, the bristles 128 of the scrubbing means 124 being utilized to further scrub the skin, or to scrub around or under the nails, or the like. Moreover, if desired, the block of material 122 may be provided with protective covering layer means, as hereinabove described.

The reservoir means of the present invention may comprise a single reservoir, as hereinabove described and disclosed or, as will be hereinafter described and disclosed, may comprise a plurality of reservoirs capable of being utilized to dispense cleansing compound either independently or concurrently.

Accordingly, and with reference now to FIGS. 15–17, there is shown and illustrated therein a yet further cleansing implement constructed in accordance with the principles of the present invention and designated generally by the reference character 132.

The cleansing implement 132 comprises scrubbing means 134 and reservoir means 136 adapted to be structurally associated therewith. The scrubbing means 134 may, for example, comprise a backing or handle member 138 and a plurality of bristle-like elements 141 depending therefrom. The backing or handle member 138 may be provided with a recess or opening 140 and the reservoir means 136 may comprise a plurality of container elements 142 adapted to be substantially disposed within the chamber or recess 140.

While the backing or handle member 138 may be of substantially any desired configuration, it may comprise a bottom wall 144 having the bristle-like elements 141 projecting from the lower surface thereof, a pair of side walls 146 and a pair of end walls 148 projecting from the upper surface thereof and defining therewith the chamber or recess 140.

The reservoir elements or containers 142 may be of generally tubular configuration, fabricated of a resilient material such as plastic film, metal foil, or the like, and containing therewithin a quantity of cleansing compound. One end portion of each of the reservoir members or containers 142 may be permanently closed, as by means of heat sealing 150 and the other end portions of the reservoir members or containers 142 closed in a manner enabling passage outwardly thereof of the cleansing compound under specified conditions, as by means of narrow heat seals 152.

The seals 150 and 152 may be formed in substantially any desired manner; however, as hereinbefore pointed out, for simplicity and economy of manufacture it is preferable that the seals 150 and 152 be formed, as by heat sealing. The seals 150 preferably are constructed and arranged as to preclude inadvertent opening of that end of the reservoir elements or containers 142, as by being formed by a relatively wide heat seal, or by means of a folded and sealed connection. The seals 152 are preferably constructed and arranged to rupture or fail, that is, to open that end of the reservoir element or container 142 upon the application of finger pressure to the reservoir elements or containers 142 to pressurize the quantity of cleansing compound contained therein. The seals 152 are further preferably constructed and arranged to provide a nozzle-type outlet or dispensing outlet upon such rupture, and may, for example, comprise relatively narrow heat seal connections or heat sealed connections defined by a plurality of small area adjacent heat seals. The seals 152 may be constructed and arranged to direct a flow of cleansing compound generally axially outwardly of the reservoir elements or containers 142 upon the application of finger pressure thereto, or may be constructed and arranged to provide such flow of cleansing compound obliquely to the reservoir element axis.

If the seals 152 are fabricated to provide a generally axial flow of cleansing compound, then the cleansing implement 132 would be utilized by pointing that end of the implement toward the area to be cleaned, applying finger pressure to one or more of the reservoir elements 142 and directing the resulting stream or flow of cleansing compound onto the area being cleaned or scrubbed. After the application of the cleansing compound to the area to be cleaned or scrubbed, the bristle-like elements 141 are manipulated in a standard brush-type manner to thoroughly cleanse and scrub such area. If, however, the seals 152 are constructed and arranged to direct the flow or stream of cleansing compound obliquely to the container axes, then the stream of cleansing compound may be directly applied to the area to be scrubbed as described above, or, the stream or flow of cleansing compound may be directed in generally the same direction as the bristle-like elements 141 so that the cleansing compound may be applied simultaneously with the manipulation of the bristle-like elements 141.

The reservoir elements or containers 142 may be retained in structural association with the handle or backing member 138, as by having the end portion thereof inserted within apertures or holes 154 provided in each of the end walls 148 to the handle or backing member 138.

In use, finger pressure may be applied to all of the reservoir elements or containers 142 simultaneously to thereby dispense the quantity of cleansing compounds contained therein, or, finger pressure or the like may be applied to only one of the reservoir elements or containers 142 at a time, so that separate cleansing operations may be undertaken utilizing a fresh supply of cleansing compound for each cleansing operation. At any time, one or more of the exhausted reservoir elements or containers 142 may be readily replaced. Moreover, a plurality of different types of cleansing compounds containing reservoirs may be utilized in a single handle, so that, for example, an initial scrub operation may be undertaken utilizing one variety or type of cleansing compound, followed by a scrubbing operation utilizing a differing type of cleansing compound, without necessitating a pause to change or replace the reservoir elements or containers 142.

As hereinbefore pointed out, the reservoir elements or containers may be constructed and arranged to direct the stream or flow of cleansing compound directly onto the area to be scrubbed with the cleansing implement in its normal position or the stream or flow of cleansing compound may be directed onto the bristle area. Moreover, the backing or end member may be slightly modified to further aid in directing the stream or flow of cleansing compound to the bristle area.

For example, and with reference now to FIGS. 18 and 19, there is shown and illustrated another cleansing implement constructed in accordance with the principles of the present invention and designated generally by the reference character 132'. The cleansing implement 132' is substantially similar to the cleansing implement 132, and accordingly, like parts are designated by like reference characters, the reference characters being primed.

The base wall 144' may be provided, adjacent one end portion thereof, with an elongate aperture or slot 154' extending therethrough, with the sealed end portions 152' of the reservoir members or containers 142' extending downwardly therethrough. The permanently sealed end portions 150' of the reservoir elements or containers 142' may be retained within holes or apertures provided in the opposite end wall 148', or, as shown, may be secured by means of a lip or plate portion 156 extending transversely adjacent the opposite end wall 148'. The reservoir elements or containers 142' may be either performed with the sealed end portions 152' extending obliquely, or the end portions 152' may be bent into the illustrated configuration during insertion of the reservoir elements or containers 142' in the handle or backing member 138'. For example, if the reservoir elements or containers 142' are formed to a generally straight configuration, then they may be inserted within the opening or chamber 140' of the handle or backing member 138' by initially inserting the end portions 152' into the elongate aperture or slot 148' with the reservoir elements or containers 142' in a generally vertical position, followed by bending the main portion of the reservoir elements or containers 142' and inserting the closed ends 150' thereof beneath the lip 156. With the reservoir elements or containers assembled and operatively associated with the handle or backing portion 138', the cleansing implement 132' may be utilized in the manner heretofore described and disclosed.

Additionally, the reservoir elements or containers 142 may themselves be compartmentalized, as by providing a sealed region generally centrally thereof, and fabricating both heat sealed regions 150 and 152 to be readily rupturable. Hence, pressure adjacent one end portion of each of the reservoir elements or containers 142' will cause a dispensing of cleansing compound outwardly of the adjacent end while pressure at the other end portion thereof, either simultaneously or subsequently, will cause a dispensing of cleansing compound through the heat seal adjacent to that end portion.

Moreover, and with reference now to FIGS. 20 and 21, there is shown and illustrated yet another cleansing implement constructed in accordance with the principles of the present invention and designated generally by the reference character 160. The cleansing implement 160, similarly to the cleansing implements previously described and disclosed comprises scrubbing means 162 provided with bristle-like scrubbing elements 164 extendingoutwardly thereof and removable and replaceable reservoir means 166 adapted to be structurally associated therewith.

The scrubbing means 162 may, for example, comprise a backing or handle member 168, which in turn comprises a base portion 170, the bristle-like elements 164 extending outwardly from the lower surface thereof and a plurality of generally upstanding side walls 172 to define a channel 174 for removably receiving therewithin the reservoir means 166.

The reservoir means 166 may be of generally rectangular configuration having bottom wall means 176, side wall means 178, top wall means 180, and end wall means 182. At least the top wall means 180 is preferably of a flexible or resilient material, enabling finger pressure thereto to pressurize a quantity of cleansing compound contained therein.

At least one of the end walls 182 may be provided with nozzle means 184 adapted to direct a flow of cleansing compound outwardly and downwardly of the reservoir means 166 so that when the reservoir means 166 is disposed within the channel 174 of the scrubbing implement 162, the flow of cleansing compound will be directed towards or adjacent the bristle-like elements 164. The nozzle means 184 may be provided with closure means, such as a narrow heat sealed region 186 adjacent the end thereof adapted to be ruptured or opened upon application of finger pressure to the top wall 180 of the reservoir means 166 and to thereby form a discharge nozzle to direct the flow of cleansing compound to the bristle region.

The reservoir means 166 may be further constructed and arranged to provide a plurality of compartments or separate reservoirs for containing the cleansing compound, as by providing the nozzle means 184 at each end thereof, and compartmenting means or wall means 188 generally medially of the reservoir means 166. The reservoir means 166 may be fabricated as two separate similar halves, the end walls 188 of each of the reservoir halves being abutted together, and the reservoir halves joined, as by heat sealing adjacent the walls 188 to define the entire reservoir means 166. The reservoir means 166 may be fabricated entirely of a flexible and resilient material, such as plastic film, metal foil, wax or plasticized paper, or the like and may be either refillable or disposable.

Moreover, it is within the ambit of the present invention to provide cleansing implements of the class described wherein the scrubbing means is defined by the surface of the reservoir means, as, for example, by providing a block of foam-like material, such as a foamed plastic, poleron, or the like, or substantially any absorbent or absorbent material, the surface and texture of which is specifically chosen for the particular cleansing operation desired, and may be firm, stiff and rough, for example, for surgical scrub use, or may be relatively soft and smooth, for example, for cleansing sensitive areas, such as on a baby's skin. In any event, however, the block of material is preferably saturated or impregnated with an appropriate cleansing compound, such as Phisohex solution. Furthermore, if separate scrubbing means is provided adapted to be structurally associated with the reservoir means of the present invention, the scrubbing means preferably is fabricated of materials capable of being sterilized by conventional techniques, such as, without limitation, gas autoclaving, steam autoclaving, boiling, immersion in germicidal, bacteriacidal or fungicidal solutions, or the like.

While the present invention has been hereinabove described and disclosed particularly in terms of scrubbing implements especially for surgical pre- or post-operative scrub purposes, it is to be expressly understood that this exemplary use is disclosed herein for exemplary purposes only, and the invention is not to be deemed limited thereby. For example, cleansing implements constructed in accordance with the principles of the present invention may also be utilized for many other purposes, such as, for example, by substituting a fungicidal compound for the cleansing compound, the present invention is eminently suitable for use in propylaxis and treatment of fungicidal infections, such as athlete's foot. Moreover, by the substitution of a shampoo type compound, the present invention is equally suitable for shampoos, or the like, or with either a mild soap or a germicidal soap, such as Phisohex, for home use in ordinary skin care.

In any case, the present invention provides cleansing implements which are inexpensive, readily sterilizable, and simple and easy to use.

It is to be understood that substantially any material having absorbent qualities, either rigid and with the compound released by water action or flexible, with the compound being released by water action plus pressure, such as felted fibrious pads, gauze pads, cheesecloth, knitted or woven fabric pads, or the like, may also be utilized in this invention without departing from the scope thereof.

Additionally, implements may be constructed in accordance with the present invention substantially identical to any of the embodiments hereinelsewhere described and disclosed wherein the backing member or handle is not provided with any apertures, slits, orifices, or the like, adjacent the bristles and the foam block may be adapted for direct application of the compound to the surface being treated or cleansed. For example, the foam block may be enlarged so as to project outwardly of the rear of the backing member or handle, that is, oppositely of the bristle-like members. In use, such an implement would be used inverted, that is, with the foam block in contact with the skin or other surface to be cleansed or otherwise treated to apply the compund thereto, and then the implement turned over for scrubbing the skin.

Furthermore, if desired, an additional flexible cover, such as a plastic cover, may be positioned over the foam block so that the cover and the handle or backing member together enclose the foam block. The cover may be provided with apertures for enabling water or the like to enter and mix with the soap or other compound in the foam block or reservoir. The cover would preferably be fabricated with at least a portion thereof being flexible so that digital or finger pressure thereon may force the compound or compound-water solution or mixture outwardly to the bristles. The cover may be of substantially any shape i.e., formed with a handle on it, or concave, or the like, if desired.

Preferably, implements constructed in accordance with the present invention are of such a size and configuration as to be easily gripped and manipulated by the fingers of one hand. Moreover, implements constructed in accordance herewith may be fabricated on such materials, such as plastics, and constructed and arranged as to be substantially flexible, enabling the implement to be squeezed, kneaded, twisted or otherwise modified or manipulated to reach substantially any desired areas of the hands, or the like, such as the base of the hand between the fingers. The handle or backing member may also be provided with orifices, apertures, openings, ribs, striations, corrugations, or other surface treatments or configurations to allow compound flow therethrough or to give a firm digital or finger grip while scrubbing.

The reservoir means of the present invention may further comprise one or more blocks of foam-like material glued or otherwise secured with the outer side surfaces of the handle or backing member, enabling the under surface of the foam-like blocks to dispense the compound or soap.

Still further, the reservoir means of the present invention may comprise one or a plurality of capsules or chamber members adapted to be inserted within the recess of the backing member or handle and adapted to have the lower wall portions thereof pierced by means of piercing pins or the like provided or integrally formed with the handle or backing member projecting into the recess thereof, that is, projecting oppositely of the bristles from the bottom wall of the handle or backing member. Such capsules may be engaged and pierced by the piercing members, and the compound dispensed to the bristle region of the implement by direct finger or digital pressure to the capsule.

As heretofore pointed out, the scrubbing means of the present invention may be molded as a unitary assembly, the bristle being formed of the same material as the backing or handle member and integrally therewith. Accordingly, and with reference now to FIGS. 22–27, there is shown and illustrated a cleansing implement constructed in accordance with the present invention and designated generally by the reference character 200 which comprises brush means 202 and reservoir means, such as a block of foam-like material 204 adapted to be structurally associated therewith.

The brush means 202 may, as hereinbefore pointed out, be integrally formed, in a single operation, as by injection molding, or the like, from an appropriate material, such as plastic. The brush member 202 may, for example, be fabricated of a thermoplastic material, such as polyethylene which is preferably formulated such that the entire brush member 202 will be somewhat flexible, enabling the brush member 202 to be readily manipulated, twisted and bent by finger pressure to completely follow all of the contours of a surgeon's hand, for example, and to further provide the bristle-like members thereof with an appropriate stiffness so as to be both comfortable and effective in their scrubbing action.

The brush member 292, for example, may comprise a generally rectangular plate-like member 206, approximately 3⅜ inches long, one and ⅜ inches wide and .14 inch thick. A pair of side walls 208 may be provided extending generally upwardly from adjacent the side edges of the plate-like member 206. The side walls 208 may, for example, be approximately ½ inch high and .08 inch thick. A pair of end walls 210 may also be provided extending generally upwardly from adjacent the end portions of the plate-like member and between the side walls 208. The end walls may also be approximately .08 inch thick and provided with generally arcuate upper edge portions 212 having, for example, a radius of approximately 1¼ inches, and a depth of approximately ⅜ inch. The provision of such an arcuate upper edge portion serves a dual function. Firstly, it increases the flexibility of the implement 200 about the longitudinal axis thereof, enabling easier scrubbing of regions such as the base of the fingers. Secondly, it permits easy insertion and removal of the block of material 204 from associated with the brush member 202.

The side walls 208 may be provided with a plurality of semi-cylindrical ridges 214 extending outwardly therefrom and having their axes disposed in a generally vertical direction and, for example, the ridges 214 may have a diameter of approximately 3/32 inch, extending generally outward from the side walls 208 approximately .020 inch and having their axes spaced apart approximately .10 inch. The provision of such ridges enables the implement 200 to be readily grasped by the user's fingers, without slippage, and the side walls 208 are of a sufficient height as to enable the brush to be grasped and manipulated without the user's fingers extending substantially downwardly therefrom to thereby eliminate the danger of contamination by finger contact of a surface being scrubbed.

The side walls 208 may be further provided with a plurality of inwardly extending generally vertical ridges 216 having a depth of approximately .01 inch, a width of approximately .04 inch, and spaced apart a distance of approximately .05 inch. The ridges 216 are effective to reduce or preclude any tendency of the block of material 204 to move longitudinally relative to the brush member 202 during use and manipulation thereof and to aid in retaining the block of material 204 disposed adjacent the plate-like portion 206. Yet further, the side walls 208 may be provided with a plurality of generally horizontally extending rides 218, extending inwardy of the side walls 208 approximately .04 inch. The horizontal ridges 216 may, for example, be provided adjacent the plate-like portion 206, adjacent the upper edges of the side walls 208, and generally medially thereof, as shown. The horizontal ridges 218 further assist in retaining the block of foam-like material 204 disposed relative to the brush member 202.

Dispensing means, such as a plurality of generally rectangular apertures 220 may be provided extending through the plate-like portion 206 for enabling as passage of cleansing compounds from the block of foam-like material 204 generally downwardly of the brush member 202. The apertures 220 may, for example, be evenly disposed in a generally grid-like arrangement, along generally mutually perpendicular columns and rows. The apertures 220 may, for example, be approximately .06 inch wide by approximately .14 inch long, the adjacent columns being separated by approximately .23 inch and the adjacent rows being separated by approximately .125 inch. In other words, the axes of the rows may be spaced apart approximately .18 inch and adjacent columns approximately .39 inch.

As hereinbefore pointed out, a pluarilty of bristle-like members 222 may be integrally formed extending generally dawnwardly from the plate-like member 206. The bristle-like members 222 may, for example, be of generally equilateral triangular cross-sectional configuration and arranged in generally linear rows, with the base sides therof in line and with the bristles each facing in the same direction and in even columns. For example, two rows of bristle-like members 222 may be disposed between each adjacent row of apertures 220, as shown in FIG. 25, the bases of one of such rows being adjacent the edges of one row of apertures and the apices of the other row of bristle-like members being disposed adjacent the adjacent row of apertures 220. Each of the bristle-like elements 222, as heretofore pointed out, may be of generally equilateral triangular cross-sectional configuration and may, for example, taper from a width of approximately .06 inch adjacent the plate-like portion 206 to a width of approximately .03 inch at a distance approximately .06 inch from the tip end of an overall length of approximately .6 inch. The tip portion of each of the bristle-like elements 222 may be formed to approximately a 7/64 radius to the points, resulting in a bristle which is quite comfortable against the skin while yet being a highly effective scrubbing action.

The block of foam-like material 204 may comprise substantially any absorbent material, such as an open pored foam plastic, for example, poloron, and is preferably of slightly greater dimensional extent than the distance between the side and end walls 208 and 210, respectively. For example, the block of material 204 may be approximately 1.9 inches wide, 3.5 inches long and .8 inch high, so that the block will be under slight compression when inserted between the side and end walls 208 and 210 so as to be securely retained therein against accidental dislodgement without necessitating the use of any adhesive, or the like.

The implement hereinabove described has a number of special qualities, in addition to those heretofore pointed out. Firstly, the implement is dimensioned for ease of usage and handling, is light in weight, weighing approximately ½ ounce, is shaped for effective grasping and manipulation, is flexible and compressible to effectively scrub interdigital areas and small or large hands. A substantially normal scrub procedure is ensured as the soap can be dispensed into the bristles by finger pressure of the hand holding the brush. There need not be a turning over of the brush to dispense soap and scrubbing can be done in a fluid motion. There is little danger of contaminating a scrub since the sides of the brush are sufficient size so that when a hand that is scrubbed grips the brush, the surgeon's finger nails will not come in contact with the unscrubbed hand so that contamination of a scrubbed hand will not occur. The bristles are of sufficient firmness to effectively scrub the hand, are shape to do the nails effectively, and yet is not irritating to the skin. The present implement is also highly effective as a patient pre-op scrub or wash implement since the implement need not be turned over during scrubbing operations and contamination of the bristles will not occur. After dipping of the brush in a pan of sterile water the present invention can be used as a skin preparer, with no fear of contamination. Tapping the sponge causes suds to enter the bristles. For scrubbing, here again, the sides of the implement are wide enough so as not to touch the prepared areas with the finger tips. Moreover, the present implement is very economical, being capable of fabrication in a single operation on an injection molding machine.

With reference now to FIG. 28, there is shown and illustrated another configuration of bristles suitable for use with the present invention, and designated generally by the reference character 224 which is provided with a generally axially extending bore 226, enabling the direct dispensing of the cleansing compound to the tip of the bristle.

Additionally, the bristle-like elements need not all be of the same, or substantially the same length, but may be varied to provide for variations in the scrubbing action. For example, and with reference now to FIGS. 29, 30 and 31, there is schematiaclly illustrated implements, 200a, 200b and 200c, respectively, substantially similar to the implement hereinabove described. The brush 200a, however, comprises alternating rows of short and long bristles, providing a more gentle scrubbing action under light pressure and a more brisk scrubbing action under heavy pressure. The implements 200b and 200c comprise sections having long and short bristles, enabling differing portions of the implement to be utilized for different parts of the skin, for example, the short bristles being stiffer for cleaning the nails with the longer bristles being softer for cleaning the skin. The implement 200b comprises a central section having shorter bristles flanked on either side by sections having longer bristles The implement 200c compirses one-half of the bristles being shorter than the other half, for a similar purpose. Moreover, the bristles may be varied as to thickness to further enable control of the scrubbing actions thereof.

Still further, the side walls and/or end walls may be eliminated, if desired, and an upwardly extending rib provided integrally formed with the plate-like portion of the implement, the foam-like member being provided with a corresponding slot to receive the rib to retain the foam-like block associated with the implement. Adhesives may similarly be utilized, if desired, to secure the block of foam-like material with the plate-like member.

It is to be expressly understood that terminology such as "upper," "lower," "bottom," "top," "inwardly" and "outwardly," as used in the preceding description and in the subjoined claims, along with other similar directional terminology, is to be construed and interpreted in its normal and accepted sense. However, such terminology is not to be construed and interpreted in a limiting sense either in the preceding description or the subjoined claims, since the same is used merely to facilitate an understanding of, and to clearly set forth and particularly define the present invention.

While the invention has been shown, described, illustrated and disclosed in terms of certain preferred embodiments or modifications which it has assumed in practice, the scope of the invention should not be deemed to be limited by the precise embodiments or modifications herein shown, illustrated, described or disclosed, such other embodiments or modifications as may be suggested to those having the benefit of the teachings herein being intended to be reserved especially as they fall within the scope and breadth of the claims here appended.

What is claimed is:

1. An implement comprising, an elongated brush member having a plate-like member having a plurality of wall portions formed integrally therewith and extending outwardly from one of the surfaces thereof, said plate-like member having a plurality of bristle-like elements formed integrally therewith and extending outwardly from the other surface of said plate-like member and defining a bristle array, said plate-like member being provided with a plurality of aperture extending therethrough wherein said apertures are disposed within said bristle array and outwardly thereof along at least a portion of the peripheral edges of said plate like member, said plate-like member and said wall portions defining a recess, a mass of absorbent and resilient material having a quantity of cleansing compound contained therein disposed within said recess and extending outwardly beyond the edges of said wall portions, and means for positionally securing said mass of absorbent and resilient material within said recess, whereby said apertures disposed within and outwardly of said bristle array provide for the copious flow of cleansing compound from said mass of absorbent and resilient material through and around said bristle array.

2. Implement defined in claim 1 wherein said bristle-like elements are all of substantially the same height.

3. Implement defined in claim 1 wherein said bristle-like elements are of at least two different heights, enabling the differing height bristles to provide differing scrubbing actions.

4. Implement defined in claim 1 wherein said wall portions extend substantially along the edge portions of said plate-like member.

5. Implement defined in claim 1 wherein said wall portions extend substantially along the edge portions of said plate-like member, and the apertures disposed outwardly of said bristle array are positioned along at least a portion of the peripheral edges of said plate-like member.

6. Implement defined in claim 1 wherein said means for positionally securing said mass of material within said recess comprises ridge means formed integrally with said wall portions inwardly of said plate-like member.

7. Implement defined in claim 6 wherein said ridge means comprises a plurality of ribs extending generally longitudinally of said walls adjacent said plate-like member.

8. Implement defined in claim 6 wherein said ridge means comprises a plurality of ridges extending generally perpendicularly and inwardly of said plate-like member for retaining said mass of material against movement generally laterally thereof.

9. Implement defined in claim 6 including a plurality of ridges extending generally outwardly of said walls to enable the brush member to be firmly grasped and manipulated.

10. Implement defined in claim 1 wherein said brush member is fabricated from a flexible material.

11. Implement defined in claim 10 wherein said flexible material comprises polyethylene.

12. Implement defined in claim 1 wherein said bristle-like elements are arranged in generally mutually perpendicular rows and columns, said apertures being disposed between said rows and columns.

13. Implement defined in claim 12 wherein said apertures are generally rectangular and disposed in generally mutually perpendicular rows and columns.

14. Implement defined in claim 12 wherein two rows of bristle-like members are disposed between adjacent rows of said apertures.

15. Implement defined in claim 12 wherein said bristle-like elements comprise generally equilateral triangular cross-sections.

16. Implement defined in claim 15 wherein said generally equilateral triangular bristles all face in the same direction.

17. Implement defined in claim 15 wherein said bristle-like members are tapered generally toward the tip portions thereof.

18. Implement defined in claim 17 wherein the tip portions of said bristle-like elements are configured to a truncated cylindrical quadrant surface having its axis generally parallel to said plate-like member and to the base of the triangular section.

19. Implement defined in claim 1 wherein said mass of absorbent and resilient material comprises a block of foam plastic.

References Cited

UNITED STATES PATENTS

| | | | |
|---|---|---|---|
| 1,047,739 | 12/1912 | Brandt | 15—110 |
| 1,521,783 | 1/1925 | Mendoza | 401—291 |
| 1,867,738 | 7/1932 | Fraser | 206—73 |
| 2,254,498 | 9/1941 | Scharf | 40—142 |
| 2,516,491 | 7/1950 | Swastek | 401—28 |
| 2,946,074 | 7/1960 | Caldwell | 401—28X |
| 2,952,027 | 9/1960 | Caldwell | 401—28 |
| 3,122,684 | 2/1964 | Genin | 40—142X |
| 3,125,776 | 3/1964 | Lilley | 15—159.1UX |
| 3,237,237 | 3/1966 | Hager et al. | 401—28 |
| D. 197,696 | 3/1964 | Vallis | 15—159.1UX |

OTHER REFERENCES

Housewares Review, July 1957, pages 78–79.

EUGENE R. CAPOZIO, Primary Examiner

H. S. SKOGQUIST, Assistant Examiner

U.S. Cl. X.R.

401—291

UNITED STATES PATENT OFFICE
CERTIFICATE OF CORRECTION

Patent No. 3,556,667  Dated January 19, 1971

Inventor(s) Jack W. Kaufman

It is certified that error appears in the above-identified patent and that said Letters Patent are hereby corrected as shown below:

Column 1, line 23, "scrubbing, means," should read -- scrubbing means, --. Column 3, line 2, "equipment" should rea -- implement --; line 39, "FIG. 5;" should read -- FIG. 15; Column 4, line 7, "thep receding" should read -- the precedi --; line 64, "comprise" should read -- comprises --. Column line 48, "per-" should read -- pre --. Column 6, line 22, "w 40" should read -- wall 50 --; line 27, "protecting" should read -- protective --; line 29, "layer 54" should read -- la 54 --; same line 29, "layer 56" should read -- layers 56 --. Column 7, line 59, "scrubing" should read -- scrubbing --; 1 63, "scraubbing" should read -- scrubbing --. Column 8, line "aperatures" should read -- apertures --. Column 10, line 53 "148 to the handle" should read -- 148 of the handle --. Col 11, lines 60 and 61, "extendingoutwardly" should read -- extending outwardly --. Column 12, line 1, "aquantity" shoul read -- a quantity --. Column 14, line 17, "292" should read -- 202 --; line 36, "associated" should read -- association lines 42 and 43, "outward" should read -- outwardly --; line "enabling as" should read -- enabling the --. Column 15, lin 13, "dawnwardly" should read -- downwardly --; line 66, "sha should read -- shaped --. Column 16, line 16, "schematially" should read -- schematically --; line 30, "bristles" should read -- bristles. --; line 31, "compirses" should read -- comprises --; line 72, "aperture" should read -- apertures -

Signed and sealed this 23rd day of May 1972.

(SEAL)
Attest:

EDWARD M. FLETCHER, JR.
Attesting Officer

ROBERT GOTTSCHALK
Commissioner of Pate